Dec. 6, 1932.   G. L. CHAMBERLAIN   1,889,974
METHOD OF JOINING TELESCOPED TUBULAR MEMBERS
Filed Aug. 14, 1929
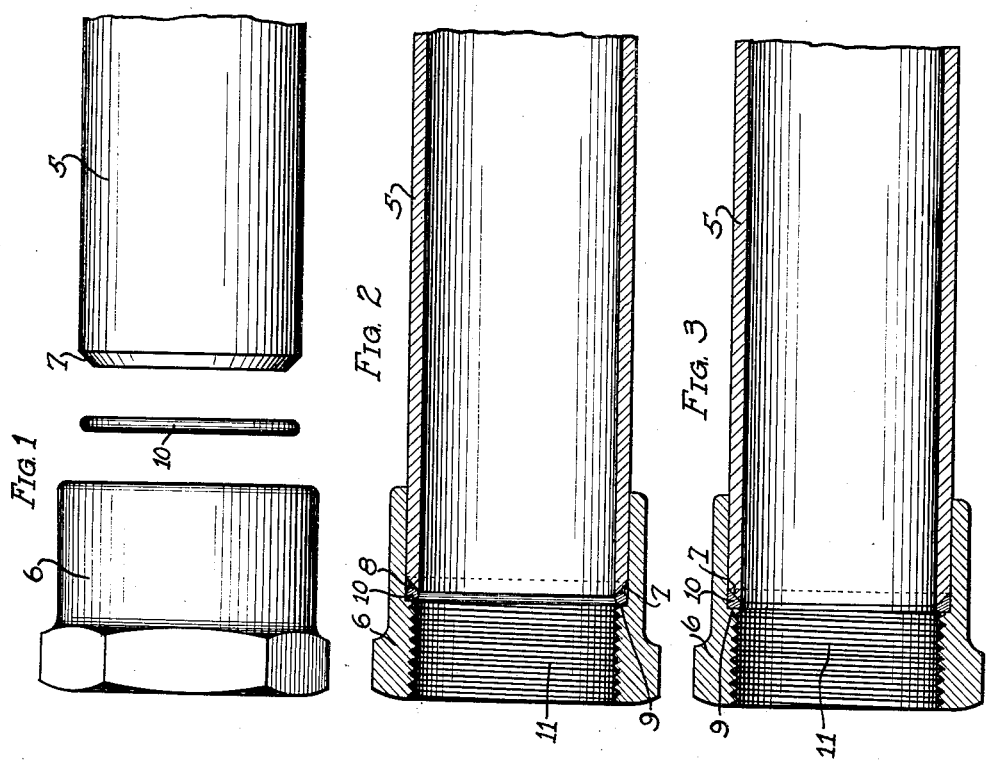
WITNESSES:
R. A. Larsson
F. C. Appleton
INVENTOR:
GEORGE L. CHAMBERLAIN,
By Joshua R. H. Potts
HIS ATTORNEY.

Patented Dec. 6, 1932

1,889,974

UNITED STATES PATENT OFFICE

GEORGE L. CHAMBERLAIN, OF CHICAGO, ILLINOIS

METHOD OF JOINING TELESCOPED TUBULAR MEMBERS

Application filed August 14, 1929. Serial No. 385,957.

This invention relates to soldered pipe connections, and methods of producing the same, and the principal objects of the invention are to produce a simple soldered jointure which is strong and durable, and leak-tight throughout the extent thereof, and to this end the invention consists in the novel structural features and in the peculiar method of effecting the jointure.

In the accompanying drawing, illustrating a practical application of the invention,—

Fig. 1 is a view, in side elevation, illustrating in detached relation the parts about to be joined;

Fig. 2 is a longitudinal section of the connected parts in their cooperative relation prior to the fusing of the soldering element;

Fig. 3 is a view similar to Fig. 2, illustrating the completed jointure; and

Fig. 4 is a detail view of the soldering element detached.

Referring now to the drawing, the numeral 5 designates a pipe section or tube, for example, a lead pipe which is to be joined to a coupling member or nipple 6, which latter will, for example, be made of a different metal or alloy, such as cast iron, steel, or brass. Connections of this character are more frequently made in plumbing and electrical work, and, of course, must not only be leak-tight or moisture-proof, but also must possess the requisite strength and durability, and while the present invention is more particularly adaptable for joining parts composed of the above noted metals, the invention is not to be limited to such, as it may be employed in connection with other metals or alloys which are capable of being joined by a sweating or soldering process.

In carrying out the present invention it is preferable to bevel the end portion of the pipe section or tube 5, as at 7, and to fit the adjacent end portion of said pipe rather snugly into the bore 8 of the member 6, at the base of which bore is preferably provided a shoulder 9. Between the shoulder 9 of the member 6 and the beveled portion 7 of the pipe or tube 5 is interposed a ring of fusible metal or solder 10, said ring being produced either commercially in a predetermined size and in one integral or continuous piece, or being formed as a split ring from a piece cut from a length of wire and in this form produced in various sizes commercially or individually by the operator for each particular job at the time it is used.

In carrying out the invention, according to the most desirable method, the ring of solder 10 is placed in the bore of the coupling member or nipple 6 and the tube 5 then inserted in the bore until the beveled end portion 7 of said tube is brought into close contact with said soldering element or ring 10. With the parts thus assembled and supported with their longitudinal axis in a horizontal plane, the assembly is rotated about said horizontal axis, and while being rotated the member 6 is subjected to the action of heat by the direct application of a flame or other source of heat sufficient to fuse the soldering element 10, whereupon it flows into the annular pocket afforded by the cooperating beveled end portion of the tube 5 and adjacent face of the bore 8.

By this manipulation of the joined members 5 and 6, an evenly soldered jointure is produced which is not only leak-tight throughout the extent thereof, but is also sufficiently strong to withstand the usage to which the connected parts are subjected, and, obviously, in cases where the member 6 is provided with internal screw threads, as indicated at 11 in the drawing, said threads may be protected from the solder by being covered with some suitable substance or compound which will prevent the solder from adhering to the threaded parts and is readily removable therefrom after the soldering operation is finished.

Having thus described my invention, what I claim as new and desire to secure by Letters Patent is:

1. The method of joining telescoped tubular members consisting in forming an internal annularly shouldered abutment in the outer receiving member, externally and annularly beveling the end of the insertable inner member, whereby to provide an undercut annular pocket between the cooperating shouldered abutment of the outer receiving member and the beveled end portion of the inserted inner member, inserting a ring of soldering material in said outer receiving member, then inserting the inner member whereby to confine said ring of soldering material between the meeting annularly shouldered abutment and beveled end portions of said tubular members, and applying heat to fuse said ring of soldering material.

2. The method of joining telescoped tubular members consisting in forming an internal annularly shouldered abutment in the outer receiving member to cooperate with the meeting end of the received inner tubular member to produce an annularly grooved pocket, inserting a ring of soldering material in said outer receiving member in juxtaposition to said annularly shouldered abutment, inserting the inner tubular member to be joined with its end retentively abutting said ring of soldering material whereby to confine said material in the resultant annular pocket, and applying heat to fuse said ring of soldering material.

In testimony whereof I have signed my name to this specification.

GEORGE L. CHAMBERLAIN.